(No Model.)   3 Sheets—Sheet 1.
A. WEED.
MACHINE FOR MAKING RASPS.
No. 499,620.  Patented June 13, 1893.
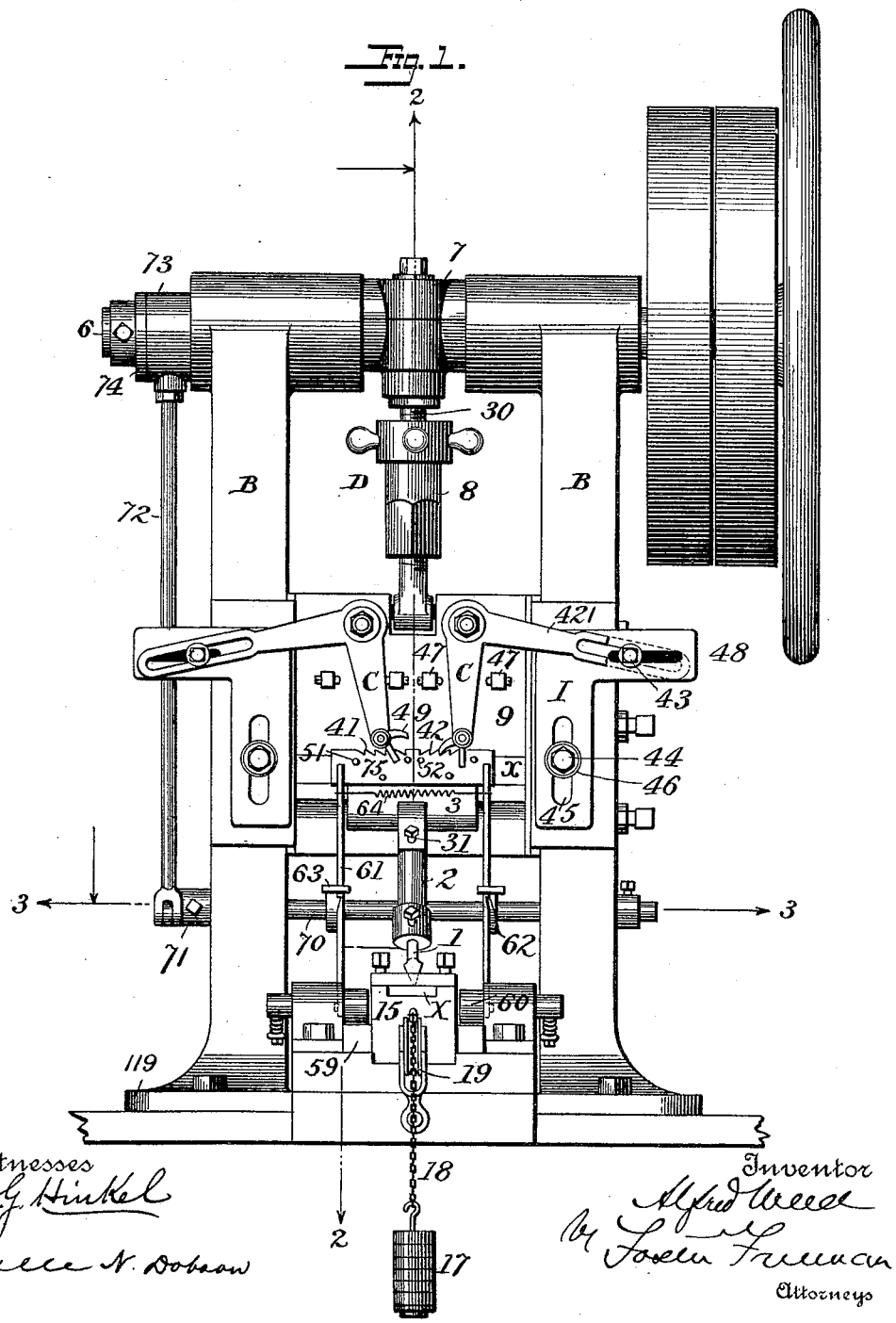

(No Model.) 3 Sheets—Sheet 2.
A. WEED.
MACHINE FOR MAKING RASPS.
No. 499,620. Patented June 13, 1893.
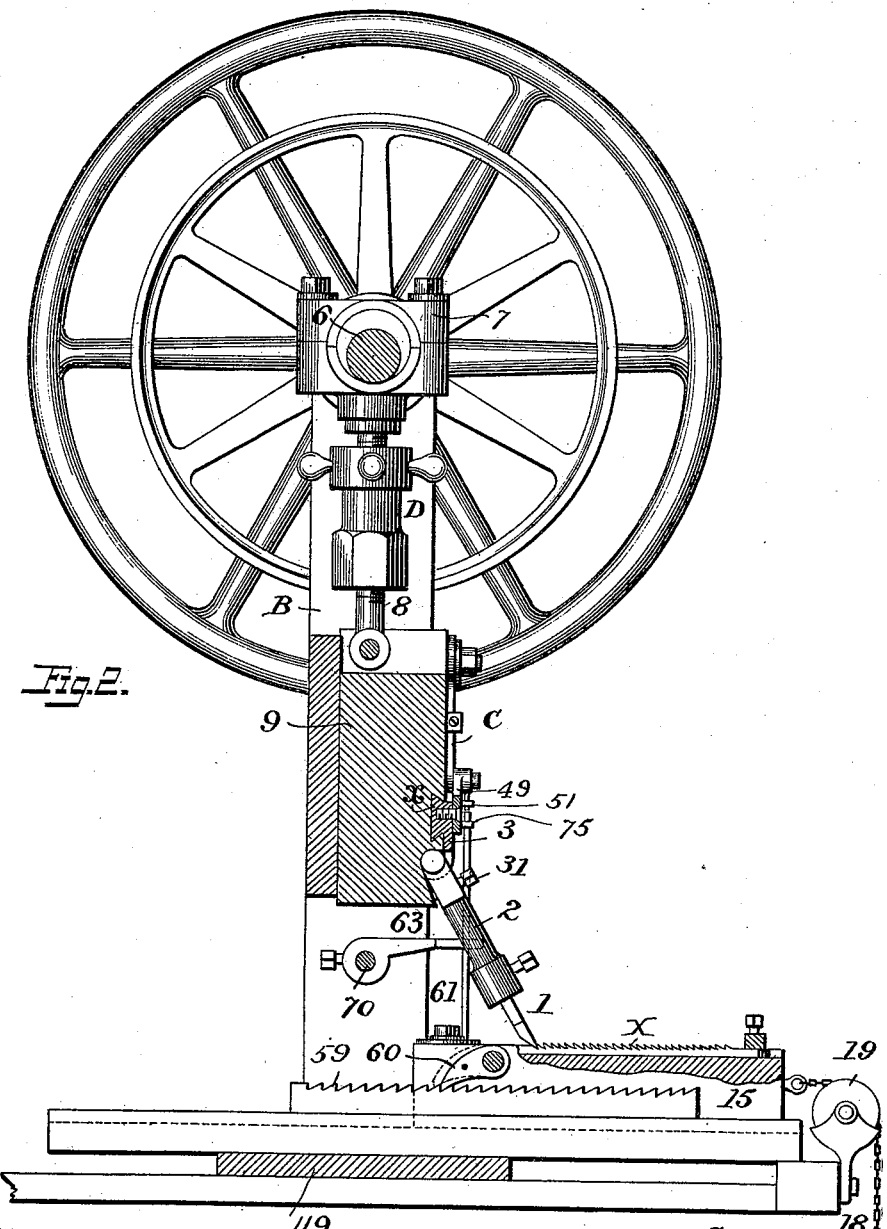

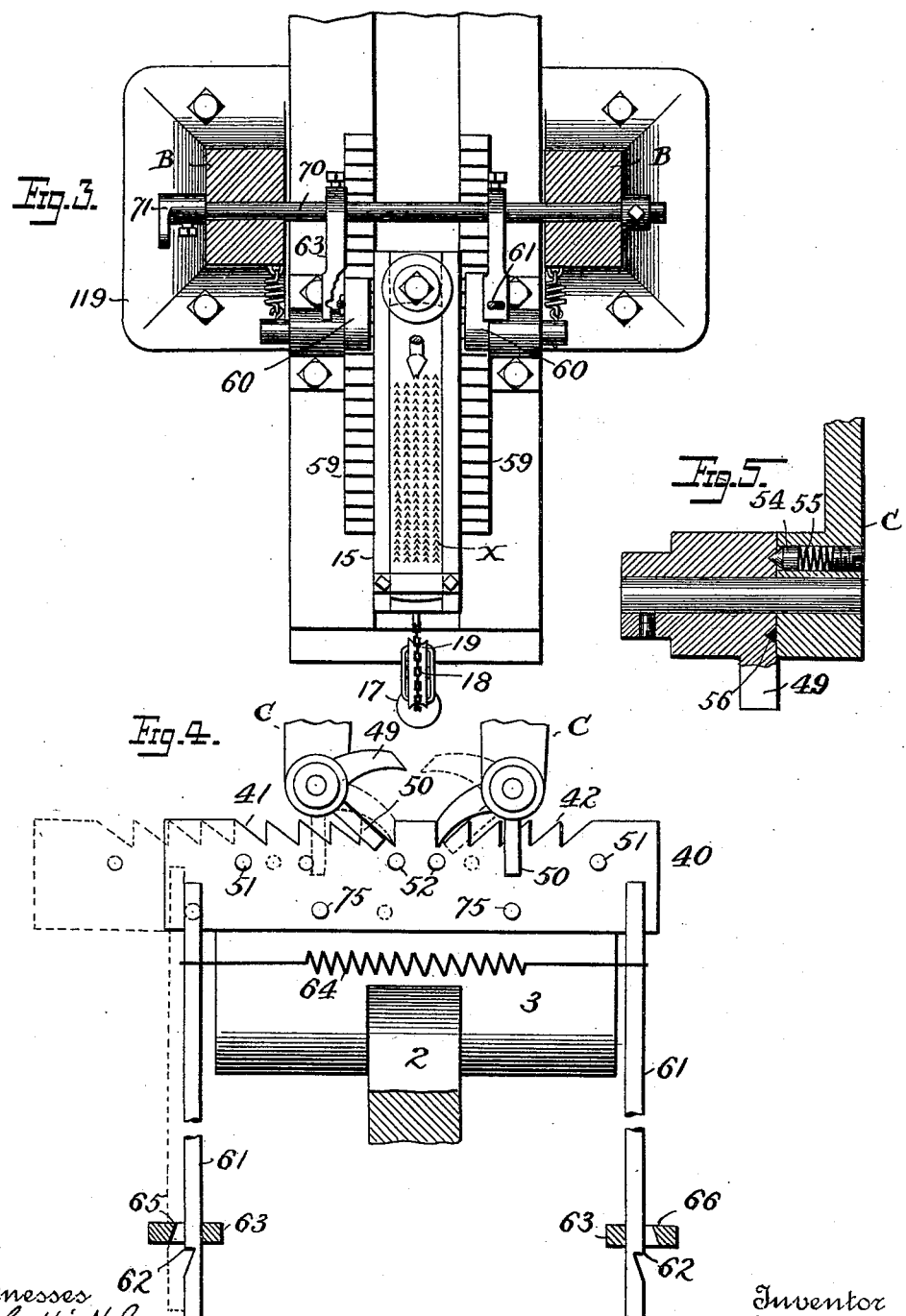

UNITED STATES PATENT OFFICE.

ALFRED WEED, OF TARRYTOWN, NEW YORK.

MACHINE FOR MAKING RASPS.

SPECIFICATION forming part of Letters Patent No. 499,620, dated June 13, 1893.

Application filed April 4, 1892. Serial No. 427,733. (No model.)

*To all whom it may concern:*

Be it known that I, ALFRED WEED, a citizen of the United States, residing at Tarrytown, Westchester county, New York, have invented certain new and useful Improvements in the Manufacture of Rasps, of which the following is a specification.

My invention relates to machines for forming the teeth of rasps; and my invention consists of means for moving the teeth cutting tool step by step from one side to the other of the blank and for feeding the latter automatically as fully set forth hereinafter and as illustrated in the accompanying drawings, in which—

Figure 1 is an elevation of my improved rasp cutting machine looking from the front; Fig. 2, a sectional elevation on the line 2—2, Fig. 1. Fig. 3 is a sectional plan on the line 3—3, Fig. 1. Fig. 4 is an enlarged view of the tool carriage and adjuncts. Fig. 5 is a section showing the connections of one of the feed pawls.

The general construction and operation of the machine are substantially that set forth in my Letters Patent No. 460,355, dated September 29, 1891. There is a tool 1, which is secured detachably in a stock 2, and which operates upon the blank X, carried by a sliding carriage 15, which is moved in one direction by means of a weight 17, upon a chain 18, passing over a guide pulley 19, the opposite movement of the carriage being effected step by step as hereinafter set forth. The stock is supported by a sliding carriage 3, upon a head 9, to which a vertical reciprocating movement is imparted by means of a crank shaft 6, through the medium of a connecting rod D, the said connecting rod being formed in two sections, one section 8 revolving upon the other section 30, which is threaded so that by turning the said section 8, the length of the connecting rod may be varied. The sliding head 9 is carried between the vertical portions of the frame B, having a base 119, that supports the sliding carriage 15, and bearings for the shaft 6, and the stock 2 is normally held in an inclined position determined by the adjustment of a set screw 31 as in the machine set forth in my aforesaid Letters Patent. In the said machine patented as aforesaid means were provided whereby to raise the teeth of the rasp upon lines which conform to curves. In many instances it is desirable to raise the teeth upon straight lines and the object of my present invention is to provide means whereby the teeth will be automatically spaced and formed in lines extending at right angles across the blank and whereby the tool will be automatically carried back to position after cutting the teeth of one row to start the first tooth of the succeeding row. Different means may be employed for effecting these movements of the tool through the medium of a carrier or carriage 3, that supports the stock upon the head 9 and devices for feeding the said carrier step by step transversely across the head and for feeding the blank one step after each row of teeth is cut. The carrier 3 may be secured to the head 9 in any suitable manner, but as shown the said carrier consists of a block dove-tailed and fitting a dove-tailed recess $x$ extending transversely across the face of the head 9, and in connection with the carrier I make use of a feeder or feeders, which it is obvious may be differently constructed so as to move each one step at one of the movements of the head to thereby feed the carrier the extent of one tooth or sufficient to carry the tool 1 laterally to the extent necessary to punch a second tooth after the first has been punched. As shown, the carrier 3 is provided with a rack 40, having two series of teeth 41, 42, inclined in opposite directions and the feeders are in the form of levers C, shown as bell crank levers pivoted each to the head and each having an arm 421 with a slot in it receiving a pin 43, upon the frame. While the pins 43 may be secured directly to the frame they are each preferably upon a plate or slide I, secured to the frame by means of a screwbolt 44, passing through a slot 45, in the slide, with a washer and a rubber disk 46, beneath the head of the nut and bearing upon the slide so that the latter can move vertically under a certain pressure but is normally held in place. By this means the reciprocating movement of the head 9 vibrates the lever to the extent permitted by certain adjustable stops 47, 47. At the same time in case of any binding of the parts the slide I can move to a certain extent so as to prevent injury or breakage. Any other suitable means of supporting the slides I so that they shall move under a frictional resistance or the pins 43 so that they shall yield under a frictional resistance may be used instead of that set forth. Each pin is adjustable in a slot 48 of the slide I so as to thereby vary the throw of the feed levers C. Each lever acts upon the ratchet plate of the follower through the medium of a pawl 49. Means are employed whereby only one of the pawls will engage with the teeth of the rack plate at one time so that as the head 9 moves up and down and the levers 3 are vibrated one of the pawls will engage with one of the racks and the carrier will be moved to one side until the last tooth engages with the pawl. After the carrier has thus been carried the full extent in one direction means are taken for throwing the pawl that has been in operation, out of operation, and the other pawl is then thrown into operation so that the reciprocation of the head and the movement of the other feed lever will feed the carrier back in the opposite direction.

One means of throwing the pawls automatically into and out of operation consists of pins upon the carrier or plate 40. Thus, the pawl has projecting from it an arm 50, which arm is in position to be struck by pins 51, 52, upon different parts of the plate 40. In the position shown in Fig. 1, the plate and the carrier have been moved to their central position, and the pin 51, at the left, has made contact with the arm of the left pawl and has thrown it up out of operation. When the head 9 again moves up the pawl at the right will be lifted from the tooth with which it is in engagement in Fig. 1, and when the head comes down the said pawl will engage the succeeding tooth, and upon the next rising and falling movement the arm 50, of the pawl at the right will be brought against the pin 51, at the right and the pawl at the right will be lifted while the pin 52 at the left will be brought against the arm 50 of the pawl at the left and the latter will be thrown down into engagement with the rack 41, after which the continued reciprocations of the head will cause the carrier to be moved toward the right again and so on. A friction detent is used for holding each pawl in the upper position to which it is set when thrown out of operation. This friction detent may be of any suitable character but as shown in Fig. 5, it consists of a spring bolt 54 against which bears a spring 55, which forces the point of the bolt into a notch 56 in the top of the pawl and holds it frictionally in its elevated position until again thrown down as above described. The carrier 3 is thus moved back and forth so as to carry the tool 1, transversely across the blank moving it one step at each reciprocation of the head and after the formation of each tooth and returning it step by step after it has reached the inner head of the blank. The stops 47, 47, are in the form of set screws passing through projections on the face of the head 9, so that by turning said screws the limitation of the stop may be varied.

The longitudinal feeding of the blank and carriage or carrier which supports the blank is effected as follows: At each side of said carriage is a rack 59, and with said rack engages a pawl 60, pivoted to a bearing upon the base-plate of the machine, one of the pawls being of such length that when one of them is in engagement with the shoulder of a tooth of one rack the other will be half way over the tooth of the other rack so that if the pawl in engagement with a tooth is lifted the weight 17 will carry the carriage 15 longitudinally until the shoulder of the tooth of the other rack engages its pawl when the movement will be stopped and so on. Any suitable means is employed for operating the pawls or lifting them alternately. Thus to each pawl is secured an elevating rod 61, having a shoulder 62, adapted to engage a reciprocating lifter 63. A spring 64 tends to hold the two rods out of engagement with the lifting shoulders 65, 66, of the lifters but as the rack or carrier approaches the limit of its movement in either direction a pin 75 projecting therefrom makes contact with the adjacent rod 61, and presses the latter outward so that when the lifter 63, again reciprocates it will engage with the shoulder of the said rod and lift the same and the pawl.

The lifters 63 may be reciprocated in any suitable manner. As shown they are in the form of arms upon a rock-shaft 70 having an arm 71 with which is connected a rod 72 extending from a strap 73 on an eccentric 74 upon the shaft 6. It will therefore be seen that the tool is automatically operated so as to descend and penetrate the metal and lift the tooth and then ascend after which it moves laterally to one side and then down again and lifts another tooth and so on till it approaches the side of the blank after which the blank will be fed one tooth farther onward and the tool will then begin and punch a row of teeth beginning at the side where it is situated and going on step by step to the opposite side or edge, after which these operations will be continued as before until the entire blank is punched.

Without limiting myself to the precise construction and arrangement of parts shown and described, I claim—

1. The combination with the reciprocating head and tool of a carriage for said tool carried by and independently movable transversely upon said head and means for moving said carriage step by step, substantially as set forth.

2. The combination of the reciprocating head and tool, of a carriage supporting said tool and carried by and independently movable transversely upon the head and means for feeding said carriage automatically step by step first in one direction and then in another, substantially as set forth.

3. The combination with the reciprocating head, sliding carriage supporting the tool and provided with racks, levers provided with pawls for engaging said racks, means for reciprocating the levers at each movement of the head, and means for throwing one of the pawls out of engagement with one rack, and the other into engagement with the other rack as the carriage reaches the limit of its movement in either direction, substantially as set forth.

4. The combination with the reciprocating head, levers and pawls, of a sliding carriage provided with racks and with pins 51, 52, substantially as set forth.

5. The combination with a reciprocating head, sliding carriage thereon, levers actuating said carriage, and pins 43 engaging said levers and adjustable substantially as set forth.

6. The combination with the reciprocating head, sliding carriage thereon, levers actuating said carriage and pins 43, of plates supporting said pins and held in place by frictional supports, substantially as described.

7. The combination of the reciprocating head, sliding carriage, feed devices for moving said carriage upon the head, a carrier for the blank and means for feeding said carrier step by step and connections between the carrier feeding devices and the carriage, substantially as set forth.

8. The combination with the sliding carriage upon the head and feed devices for the sliding blank carrier, of contact pieces for operating said feed devices to move the carrier one step as the carriage reaches the limit of its movement in either direction, substantially as set forth.

9. The combination of the head, sliding carriage provided with pins 75, sliding blank carrier, pawls 60, pawl elevating rods 61, provided with shoulders and reciprocating lifters 63, adapted to engage said shoulders, substantially as set forth.

In testimony whereof I have signed my name to this specification in the presence of two subscribing witnesses.

ALFRED WEED.

Witnesses:
ARCHIBALD M. MACLAY,
MOSES B. MACLAY.